United States Patent [19]
Rembold

[11] 4,025,127
[45] May 24, 1977

[54] WHEEL LOCK-UP PREVENTION APPARATUS

[75] Inventor: Helmut Rembold, Moglingen, Germany

[73] Assignee: Robert Bosch G.m.b.H., Stuttgart, Germany

[22] Filed: Nov. 5, 1975

[21] Appl. No.: 628,905

[30] Foreign Application Priority Data

Jan. 8, 1975 Germany .................. 2500483

[52] U.S. Cl. ................... 303/118; 303/40; 303/119
[51] Int. Cl.² .......................... B60T 8/02
[58] Field of Search .......... 303/21 F, 61–63, 303/68–69, 40, 113, 114, 115, 117, 118, 119; 188/181; 137/627.5

[56] References Cited
UNITED STATES PATENTS

| | | | |
|---|---|---|---|
| 3,731,980 | 5/1973 | Fink et al. ................ | 303/21 F |
| 3,836,209 | 9/1974 | Neisch ..................... | 303/61 X |
| 3,902,764 | 9/1975 | Sebo ....................... | 303/21 F |
| 3,937,527 | 2/1976 | Eckhart .................... | 303/40 |

Primary Examiner—Trygve M. Blix
Assistant Examiner—Doulgas C. Butler
Attorney, Agent, or Firm—Edwin E. Greigg

[57] ABSTRACT

A wheel lock-up prevention system for motor vehicles includes electromagnetic valves which decompress the main control chamber of the system when a wheel lock-up occurs and hence terminate the braking effort at the locked wheel. During re-compression, which takes place by cyclic actuation of one of the electromagnetic valves, excessively high pressure pulses are prevented by connecting the main control chamber with a surge chamber during part of the cycle so as to diminish the pressure in the main control chamber and to make the magnitude of the cyclic pressure increases inversely proportional to the total pressure in the control chamber.

3 Claims, 2 Drawing Figures

WHEEL LOCK-UP PREVENTION APPARATUS

BACKGROUND OF THE INVENTION

The invention relates to a wheel lock-up prevention apparatus for use in the braking system of a motor vehicle. The apparatus includes one relay valve whose primary side is actuated by the pressure controlled by the driver-operated master cylinder and whose secondary circuit includes a valve member which controls the pressure in one or more wheel brake cylinders. The wheel brake cylinder is controlled by alternately establishing communication from the wheel brake cylinder to a source of pressure to a relief orifice. The apparatus includes two valves connected ahead of the control chamber of the relay valve and one of these valves is in the inlet valve establishing and breaking the connection of the control chamber with a main brake control line coming from the driver-operated master cylinder whereas the other valve establishes and breaks a connection between the control chamber and a relief location. Two electromagnets associated respectively with the two valves can be actuated by an electric controller.

In the known wheel lock-up prevention apparatus of the type described, the gradual increase of pressure after each pressure drop is obtained cyclically, usually with the aid of an electronic controller. The steepness of the pressure increase, which is based both on legal requirements for braking efficiency and also on the response time of the magnetic valve, is such that the pressure increase of each and every pressure jump is so high that a renewed excessive braking effort cannot be prevented.

OBJECT AND SUMMARY OF THE INVENTION

It is a principal object of the invention to provide a wheel lock-up prevention apparatus, as described above, which prevents these disadvantages and in which the first pressure drop, after wheel lock-up, occurs very rapidly and wherein, furthermore, the subsequent pressure increase is gradually diminished in magnitude when the design pressure is approached so as to prevent renewed excessive braking force.

Briefly stated, this principal object of the invention is attained by providing a surge chamber, normally without pressure, connected to the inlet magnetic valve. When wheel lock-up has occured, the surge chamber is connected with the control chamber of the relay valve during each pressure drop during the cyclic actuation of the inlet magnetic valve, with the result that the amplitude of each pressure increase is inversely proportional to the actual pressure in the control chamber.

The invention will be better understood as well as further objects and advantages thereof will become more apparent from the following detailed description of a preferred embodiment taken in conjunction with the drawing.

DESCRIPTION OF THE PREFERRED EMBODIMENT

Figure 1:
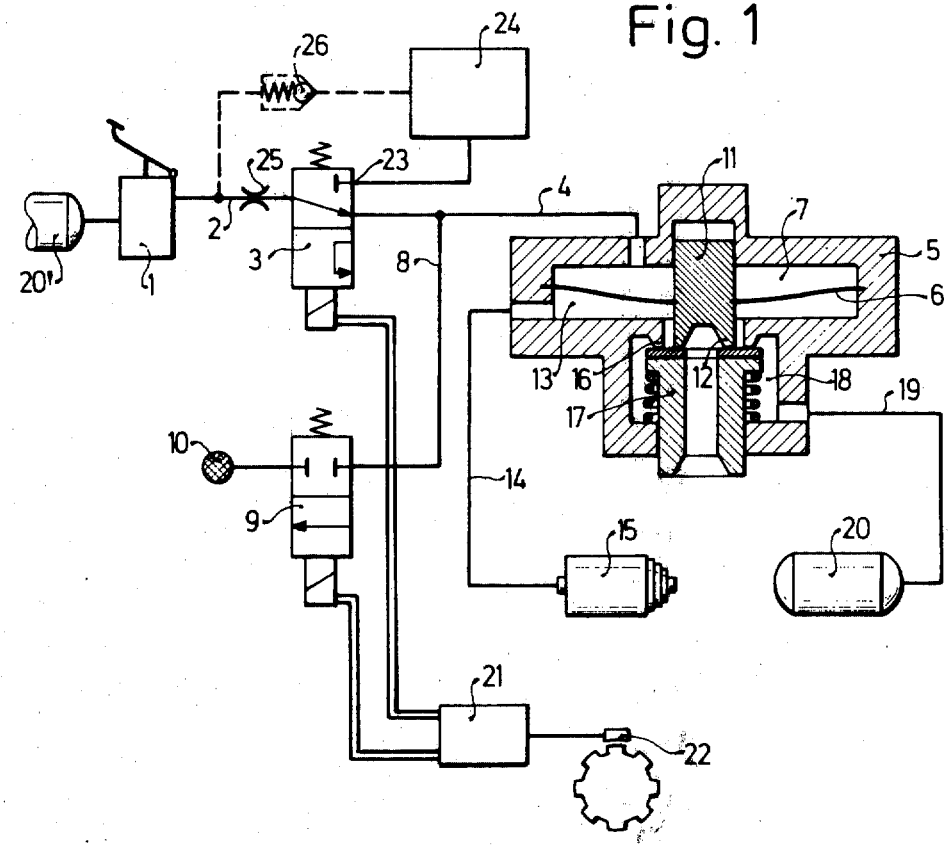
FIG. 1 shows a schematic diagram of a wheel lock-up prevention appartus according to the invention.

A driver-operated master brake valve 1 is fed from a container of pressurized air 20' and is connected by a control conduit 2 with a 3/2-way inlet magnetic valve 3. A line 4 leads from the magnetic valve 3 to a relay control valve 5. The relay control valve 5 includes a control diaphragm 6 which separates a primary braking circuit from a secondary braking circuit. The primary side of the diaphragm 6 partly defines a control chamber 7 to which the line 4 is connected. Branching off from the line 4 is a line 8 which leads to a magnetic outlet valve 9 and hence to atmosphere via an orifice 10.

Attached to the control diaphragm 6 is a valve plunger 11 and penetrates a chamber 13 that communicates at all times through a line 14 with one or more wheel brake cylinders 15. The end of the valve plunger 11 remote from the control chamber 7 has a valve seat 12 which is disposed coaxially with and interiorly of a second valve seat 16 on an annular shoulder of the relay control valve 5. Both valve seats 12 and 15 cooperate with a spring loaded valve closing member 17 which moves within a valve chamber 18 that communicates via a line 19 with a container of pressurized air 20. The driver-operated control valve 1 and the relay control valve 5 are both connected to the same pressurized air container 20 but it would be possible to provide separate containers for the two valves. The secondary control circuit of the relay control valve 5 includes the following elements: the double valve 12, 16, 17 formed by the two valve seats 12 and 16 and the valve closure member 17, the valve chamber 18, the line 19 and the storage container 20, as well as the chamber 13, the line 14 and the brake cylinder 15.

The two electromagnetic valve 3 and 9 are connected electrically to a controller 21 which, in turn, is actuated by a wheel sensor 22.

Connected to the 3/2-way electromagnetic valve 3, at a point 23, is a surge chamber 24, and connected ahead of the inlet to the electromagnetic valve 3 is a throttle 25. As shown in dotted lines in FIG. 1, the surge chamber 24 may be pressure-relieved by means of a check valve 26.

The method of operation of the wheel lock-up prevention apparatus described above, is as follows:

During normal braking, the increasing control pressure in the control chamber 7 causes an opening of the double valve 12, 16, 17. In this manner, compressed air may flow from the storage container 20 through the lines 19 and 14 to the wheel cylinder 15. As a result, the wheels of the vehicle are braked. The throttle 25 is so dimensioned that the brake cylinder 15 is pressurized at the required rate. During the release of the brake, the double valve 12, 16, 17 returns to its original position and the pressure in the brake cylinder is relieved through the hollow closure member 17 which communicates with the atmosphere.

Figure 2:
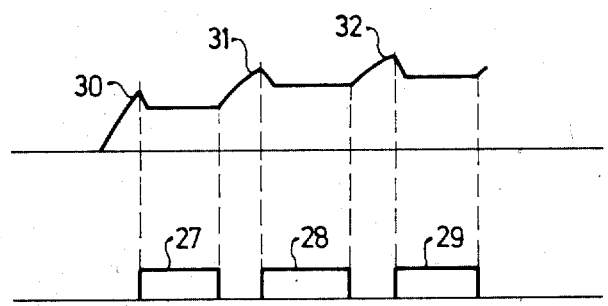
FIG. 2 is a diagram showing both the control pressure and the switching pulse of the inlet magnetic valve as a function of time.

If, on the other hand, the braking action is so powerful that wheel lock-up occurs at the brakes controlled by the brake cylinder 15, then the sensor 22 located at the vehicle wheel is activated. As a result, the two electromagnetic valves 3 and 9 receive control current from the electrical controller 21 and switch over. Consequently, the control chamber 7 is pressure-relieved through the line 8 and the magnetic outlet valve 9. Furthermore, however, compressed air from the control chamber 7 may also flow through the magnetic inlet valve 3 into the surge chamber 24. This combined pathway for air relief flow results in the pressure drop being very agrupt, which brings the advantage of a very rapid release of the brake. In the first pressure increase following the first pressure drop, when the magnetic outlet valve 9 is closed, the electric controller 21 periodically cycles the magnetic inlet valve 3, thereby increasing the pressure in the brake cylinder 15 cyclically. In this process, stationary phases alternate with pressure increase phases. During each stationary phase, the surge chamber 24 is placed in communication with the control chamber 7. Inasmuch as the surge chamber 24 is separated from the control chamber 7 during the pressure increase, when the magnetic inlet valve 3 is not actuated, the pressure in the surge chamber 24 is always lower than that in the control chamber 7. During the stationary phase, a pressure equalization takes place between the chambers 7 and 24 and the pressure in the control chamber 7 decreases by a particular amount. In this manner, each pressure increase 30, 31, 32 of the pressure in the control chamber 7 is smaller compared to the immediately preceding one, as is shown in FIG. 2, which also shows the corresponding control pulses 27, 28, 29 for the magnetic inlet valve 3. The gradual decrease of the pressure jumps 30, 31, 32 when the desired second maximum point on the pressure curve is approached, may be clearly seen. This process results in preventing excessive braking force being applied during the pressure pulse which follows each pressure drop.

At the end of a complete braking process, the surge chamber 24 must be pressure-relieved. This may be done by means of the check valve 26 which permits a drain of the air in the surge chamber back to the driver-operated control valve 1 when the control line 2 is pressure-free, as is the case during the release of the brake.

On the other hand, it is possible to control the pressure relief of the surge chamber 24 purely electrically by actuating both magnetic valves 3 and 9 for a short period of time at the end of each wheel lock-up prevention braking process. In this manner, air may escape from the surge chamber 24 to the atmospheric outlet 10.

What is claimed is:
1. a wheel lock-up prevention apparatus for use with the braking system of a motor vehicle, comprising, in combination,
   A. a source of pressurized air;
   B. a master brake control valve, supplied with air from said source:
   C. a relay control valve having a first and second control chamber;
   D. an electromagnetic inlet valve disposed between said master brake control valve and said first chamber;
   E. an electromagnetic outlet valve, connected to and capable of pressure-relieving said first control chamber;
   F. an electric controller for actuating said electromagnetic inlet and outlet valves, respectively; and
   G. a surge chamber connected to a line extending to said electromagnetic inlet valve in such a manner that actuation of said electromagnetic inlet valve causes communication between said first control chamber of said relay control valve with said surge chamber through the inlet valve by means of a line extending therebetween;
   whereby the pressure increases in said first chamber during cyclic actuation of said electromagnetic inlet valve are inversely proportional in magnitude to the magnitude of the pressure in said first chamber.

2. An apparatus as claimed in claim 1, further comprising:
   H. a check valve, disposed between said surge chamber and said master brake control valve, for selective decompression of said surge chamber during non-actuation of said master brake control valve.

3. An apparatus as claimed in claim 1, wherein said electric control can deliver periodic actuation pulses to said electromagnetic inlet and outlet valves, respectively, and said valves can respond to said periodic actuation pulses.

* * * * *